US007751334B2

(12) United States Patent
Varadarajan et al.

(10) Patent No.: US 7,751,334 B2
(45) Date of Patent: Jul. 6, 2010

(54) SYSTEM AND METHOD FOR SKYPE TRAFFIC DETECTION

(75) Inventors: Sridhar Varadarajan, Bangalore (IN); Srividya Gopalan, Bangalore (IN); Basavaraja Shanthappa Vandrotti, Bangalore (IN); K. Kalyana Rao, Banagalore (IN)

(73) Assignee: Satyam Computer Services Limited, Secunderabad (IN)

( * ) Notice: Subject to any disclaimer, the term of this patent is extended or adjusted under 35 U.S.C. 154(b) by 273 days.

(21) Appl. No.: 11/979,705

(22) Filed: Nov. 7, 2007

(65) Prior Publication Data

US 2009/0116394 A1    May 7, 2009

(51) Int. Cl.
*H04L 12/26* (2006.01)
(52) U.S. Cl. ..................... 370/244; 370/252
(58) Field of Classification Search ............ 370/389, 370/224, 352; 726/23
See application file for complete search history.

(56) References Cited

U.S. PATENT DOCUMENTS

| 5,442,699 | A | 8/1995 | Arnold et al. |
| 6,591,299 | B2 | 7/2003 | Riddle et al. |
| 6,975,592 | B1 | 12/2005 | Seddigh et al. |
| 2005/0060295 | A1* | 3/2005 | Gould et al. ............ 707/3 |
| 2006/0156404 | A1* | 7/2006 | Day ........................ 726/23 |
| 2006/0239219 | A1 | 10/2006 | Haffner et al. |
| 2007/0159979 | A1* | 7/2007 | Butler et al. ............ 370/244 |

OTHER PUBLICATIONS

Guha et al., "An Experimental Study of the Skype Peer-to-Peer VoIP System", Proceedings of the 5th International Workshop on Peer-to-Peer Systems (IPTPS '06), Santa Barbara, CA, Feb. 2006.
Dileep and Sekhar, "Identification of Block Ciphers Using Support Vector Machines", 2006 International Joint Conference on Neural Networks, Vancouver, BC, Canada, Jul. 2006.
Kitamura et al., "Traffic Identification for Dependable VoIP", NEC Technical Journal, 2006.
Baset and Schulzrinne, "An Analysis of the Skype Peer-to-Peer Internet Telephony Protocol", Proceedings of Infocom 2006.

* cited by examiner

*Primary Examiner*—Dang T Ton
*Assistant Examiner*—Kevin Lee
(74) *Attorney, Agent, or Firm*—Merek, Blackmon & Voorhees LLC; Catherine M. Voorhees (57) ABSTRACT

Networks carry various kinds of traffic and ISPs are keen to analyze the traffic so as to be able to support QoS on the distinct traffic flows. Traffic can be broadly categorized into two types: plain traffic and encrypted traffic. Further, each of these traffic types is based on either a standard protocol or a proprietary protocol. While it is fairly straightforward to analyze traffic that are based on standard protocols, it is extremely difficult to analyze encrypted traffic based on proprietary protocols. A system for Skype traffic detection involves analyzing encrypted traffic based on proprietary peer to peer protocol. The proposed approach is based on building Skype traffic models and using the same to determine Skype traffic in the network traffic.

4 Claims, 8 Drawing Sheets

OVERVIEW OF NETWORK ARCHITECTURE OF
SKYPE TRAFFIC DETECTION SYSTEM

FIG. 1: OVERVIEW OF NETWORK ARCHITECTURE OF SKYPE TRAFFIC DETECTION SYSTEM

FIG. 1A: ANOTHER ILLUSTRATIVE NETWORK ARCHITECTURE OF SKYPE TRAFFIC DETECTION SYSTEM

FIG. 2: OVERVIEW OF SYSTEM ARCHITECTURE OF SKYPE TRAFFIC DETECTION SYSTEM

FIG. 3: AN ILLUSTRATIVE INPUT

Problem of obtaining the code-book entries can be defined as: given the training data ($T$) and number of code-book entries ($N$), obtain code-book entries ($C$) such that distortion ($D$) is minimized.

where
$$T = \{X_1, X_2, X_3, ..., X_M\}$$

$M$ is total number of training data (Skype or non-Skype). $X_i$ is a histogram of 100000 bytes payload.

$$X_i = \{x_{(i,1)}, x_{(i,2)}, ..., x_{(i,k)}\} \quad i = 1, 2, ..., M$$

$k$ is vector dimension, in our case k=256 and $x_{(i,1)}$ is the relative frequency of byte 00.

$$C = c_1, c_2, c_3, ..., c_N$$

$N$ is the number of code-book entries (vectors). For Skype N=32, and for non-Skype N=48. After obtaining the Skype and non-Skype code-book, we form a universal code-book by taking union of both.

$$D = \tfrac{1}{Mk} \sum_{m=1}^{M} \|X_m - Q(X_m)\|^2$$

$Q(X_m)$ is the quantized value of the $X_m$.

1. Given $T$, $\Delta > 0$ ($\Delta$ to be a small number. We have taken $\Delta = 0.0001$)

2. Let $N=1$, calculate the code-book entry $c_1^*$ by taking the average of the training data, calculate the distortion $D^*$ for $c_1^*$ 3. Splitting: for i = 1, 2, ... N $$c_i^0 = (1 + \Delta)c_i^*$$

$$c_{N+i}^0 = (1 - \Delta)c_i^*$$

set N= 2N 4. iteration: Let $D^{(0)} = D^*$, set the iteration index i=0;

(a) for $m=1, 2, ..., M$, find the minimum value of $$\|X_m - c_n^{(i)}\|^2$$

for all n= 1, 2, ..., $N$. Let $n^*$ be the index which gives minimum distortion. Set $$Q(X_m) = c_{n^*}^{(i)}$$

(b) For n=1, 2, ..., $N$, update code vector $$c_n^{i+1} = \frac{\sum_{Q(X_m)=c_n^{(i)}} X_m}{\sum_{Q(X_m)=c_n^{(i)}} 1}$$

(c) Set i=i+1.
   (d) Calculate the distortion $$D^i = \tfrac{1}{Mk} \sum_{m=1}^{M} \|X_m - Q(X_m)\|^2$$

(e) $(D^{(i-1)} - D^i)/D^{(i-1)} > \Delta$, go to step (a)
   (f) Set $D^* = D^{(i)}$. For n = 1, 2, ..., N, set $$c_n^* = c_n^{(i)}$$

as final code vectors.

5. Repeat steps 3 and 4 until the desired number of code vectors is obtained.

FIG. 4: ALGORITHM FOR TRAFFIC MODELING

FIG. 5: ILLUSTRATIVE TRAFFIC MODELS

1. For i= 1, 2, ..., M, calculate $$D(X_i) = min_j \frac{1}{k}||X_i - c_j)||^2 \qquad 1 \leq j \leq N$$

$$j_i^* = argmin_j \ D(X_i)$$
$$\text{if } j_i^* <= 32$$
$$p_i = 0$$
$$\text{else } p_i = 1$$

2. calculate $$D = \frac{1}{M} \sum_{i=1}^{M} D(X_i)$$

$$index = \frac{1}{M} \sum_{i=1}^{M} p_i$$

3. If $D < threshold(0.00009)$ and if $index <= index\ threshold(0.2)$, declare T as Skype else non-Skype.

FIG. 6: ALGORITHM FOR SKYPE TRAFFIC DETECTION

|  | Available Flows in Traffic | Identified by SDE | Accuracy |
|---|---|---|---|
| True Positive | 75 | 74 | 98.7% Skype traffic identification |
| False Negative |  | 1 | 1.3% Skype traffic identified as non-Skype |
| True Negative | 2119 | 2072 | 97.78% of non-Skype traffic is identified as non-Skype |
| False Positive |  | 2072 | 2.2% of non-Skype traffic is identified as Skype |

Fig. 7: Experimental Test Results

SYSTEM AND METHOD FOR SKYPE TRAFFIC DETECTION

FIELD OF THE INVENTION

The present invention relates to traffic analysis in general and more particularly, traffic analysis of peer to peer traffic. Still more particularly, the present invention is related to a system and method for analyzing encrypted traffic that is based on proprietary protocol by building traffic models and using the same for traffic analysis.

BACKGROUND OF THE INVENTION

ISPs require to exercise a very fine control over the traffic carried by their networks in order to support QoS related to various of these traffic flows. One of the ways to assess network load is by analyzing the traffic flows through the network and this assessment would in turn help manage SLAs. Another use of the network analysis is to help in network capacity planning by assessing the load due to each of the network protocols. A typical network traffic is based on a standard protocol and the knowledge of the protocol is quite adequate to determine the traffic based on that protocol. In this case, the header analysis and state machine based analysis would help determine the traffic related to the various standard based protocols. On the other hand, there are a handful of protocols that are proprietary based and unless update information about these protocols is made available by proprietary protocol owners, it becomes a big challenge to determine the flows related to these protocols. However, it is very important for ISPs to know about these protocols as well. In many cases, such protocols could be discovered by careful analysis of the various protocol states. Hence, it is required for the protocol header to be available in plain form for analysis. In case the proprietary protocol header/payload gets encrypted, it becomes a bigger challenge to determine the same. It is very useful to device techniques that can help identify such encrypted proprietary protocols.

DESCRIPTION OF RELATED ART

U.S. Pat. No. 5,442,699 to Arnold; William C. (Mahopac, N.Y.), Chess; David M. (Mohegan Lake, N.Y.), Kephart; Jeffrey O. (Yorktown Heights, N.Y.), Sorkin; Gregory B. (New York, N.Y.), White; Steve R. (New York, N.Y.) for "Searching for patterns in encrypted" (issued on Aug. 15, 1995 and assigned to International Business Machines Corporation (Armonk, N.Y.)) describes a searching method to determine, given a specified encryption method (or set of encryption methods) and a specified pattern (or set of patterns), whether a given text contains an encryption, with any key, of anything fitting the pattern or patterns. The procedure detects and locates patterns that are present within data that has been encrypted, provided that the encryption method is one of a variety of simple methods that are often employed by computer programs such as computer viruses.

U.S. Pat. No. 6,591,299 to Riddle; Guy (Los Gatos, Calif.), Packer; Robert L. (Rancho Santa Fe, Calif.), Hill; Mark (Los Altos, Calif.) for "Method for automatically classifying traffic with enhanced hierarchy in a packet communications network" (issued on Jul. 8, 2003 and assigned to Packeteer, Inc. (Cupertino, Calif.)) describes a method for applying individual instances of traffic classification paradigms to packet network flows based on selectable information obtained from a plurality of layers to define a characteristic class, then mapping the flow to the defined traffic class. The flow specification is provided with some application-specific attributes, some of which are discoverable. The discoverable attributes lead to an ability to automatically create sub-nodes of nodes for finer-grained control.

U.S. Pat. No. 6,975,592 to Seddigh; Nabil N. (North Gower, Calif.), Nandy; Biswajit B. (Kanata, Calif.), Bennett; Don W. (Ottawa, Calif.), Liu; Yajun (Nepean, Calif.), Wang; Dabin (Nepean, Calif.), Cao; Carl F. (Nepean, Calif.) for "Configurable rule-engine for layer-7 and traffic characteristic-based classification" (issued on Dec. 13, 2005 and assigned to Nortel Networks Limited (CA)) describes a system and method for data flow classification based on a configurable rule-engine. The system includes a data flow managing mechanism configured to identify, track, and manage the data flows and a rule set, which includes a plurality of rules for comparing information contained within data flow with pre-specified values.

U.S. Pat. App. No. 20060239219 by Haffner; Patrick Guy; (Atlantic Highlands, N.J.); Sen; Subhabrata; (New Providence, N.J.); Spatscheck; Oliver; (Randolph, N.J.); Wang; Dongmei; (Kearny, N.J.) titled "Application signature based traffic classification" describes a method for identifying traffic to an application including the steps of monitoring communication traffic in a network, identifying data from communication traffic content, and constructing a model for mapping the communication traffic for an application derived from data identified from the communication traffic content is described.

"An Experimental Study of the Skype Peer-to-Peer VoIP System" by Guha S., Daswani N., and Jain R. (appeared in the Proceedings of The 5th International Workshop on Peer-to-Peer Systems (IPTPS '06), Santa Barbara, Calif., February 2006) describes an experimental study of Skype VoIP traffic conducted over a five month period, where over 82 million datapoints were collected regarding the population of online clients, the number of supernodes, and their traffic characteristics.

"Identification of Block Ciphers using Support Vector Machines" by Dileep A. D., and Chandra Sekhar C. (appeared in the Proceedings of the 2006 International Joint Conference on Neural Networks, Vancouver, BC, Canada, July 2006) describes an approach for identification of encryption method for block ciphers using support vector machines.

"Traffic Identification for Dependable VoIP" by KITAMURA Tsutomu, SHIZUNO Takayuki, OKABE Toshiya, TANI Hideaki (appeared in NEC Technical journal, 2006) describes a traffic identification technology that analyzes the packet exchange patterns as the key to traffic control without being dependent on the port numbers and signatures.

"An Analysis of the Skype Peer-to-Peer Internet Telephony Protocol" by Baset S. A., and Schulzrinne H. G. (appeared in the Proceedings of Infocom 2006) analyzes key Skype functions such as login, NAT and firewall traversal, call establishment, media transfer, codecs, and conferencing under three different network setups. Analysis is performed by careful study of the Skype network traffic and by intercepting the shared library and system calls of Skype.

The known systems do not address the various issues related to the analysis of encrypted traffic and its payload related to a proprietary protocol. The present invention provides a system for addressing these issues in order to achieve efficient analysis of proprietary protocols.

SUMMARY OF THE INVENTION

The primary objective of the invention is to determine Skype traffic in a network that carries heterogeneous network traffic.

One aspect of the present invention is to analyze encrypted network traffic.

Another aspect of the present invention is to analyze proprietary protocols

Yet another aspect of the present invention is to determine a plurality of models by analyzing an encrypted proprietary protocol based network traffic.

Another aspect of the present invention is to analyze network traffic to detect a proprietary protocol based on a plurality of traffic models.

BRIEF DESCRIPTION OF THE DRAWINGS

FIG. 4 provides an algorithm for building traffic models.

DETAILED DESCRIPTION OF THE PREFERRED EMBODIMENTS

Traffic analysis is an important activity undertaken with respect to any network. As part of the network planning, it is very essential to understand the various kinds of traffic that flow through a network. Specifically, it is useful to analyze the traffic to determine the load on the network due to different traffic classes. Here, a traffic class could be either based on a protocol or based on an application. The traffic-class-wise characterization of a network provides an opportunity for the ISPs to deal with load on the network as well as the QoS requirements. For example, it is possible to predict the load on the network due to each of these classes and plan appropriately. Note that the QoS requirements are quite different for each of the traffic classes. One of the important class of traffic is a peer-to-peer traffic and its equally important subclass is Skype traffic. Skype is a peer-to-peer VoIP system to enable telephonic conversations between peers. It is Internet based and hence uses IP protocol to make and tear connections, and to transport voice traffic. Skype uses a proprietary protocol and transport encrypted payload. Hence, it has proved to be a big challenge to detect Skype traffic through a network. The main objective of the present invention is to analyze network traffic to detect Skype traffic.

Figure 1:
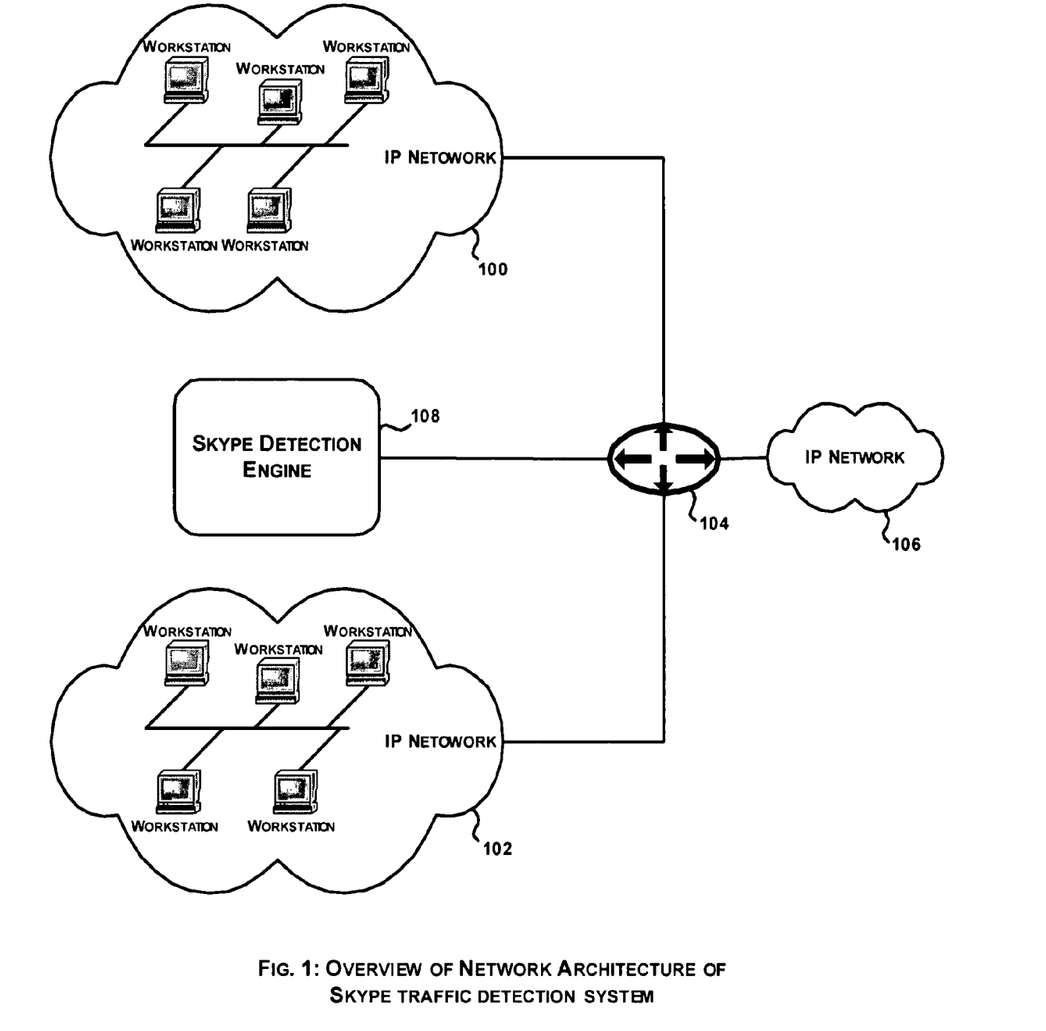
FIG. 1 depicts an overview of the network architecture of Skype traffic detection system.

FIG. 1 depicts an overview of a typical network architecture of Skype Detection Engine. In a typical enterprise, multiple networks are connected through a router to an external network (say, Internet). Each of these local area networks (100 and 102) are connected to a router (104). The router is in turn connected to an external network (106). In such a network, Skype Detection Engine (SDE) (108) is connected to the router (104) so as to get access to the entire network traffic.

SDE could operate in modes: in passive mode, it obtains a copy of the passing packet (traffic) and analyzes the same to detect the possible Skype flows; on the other hand, it active mode, SDE is in the path of packet of processing within the router and its decision with regard to a flow could have an impact on the flow.

Figure 1A:
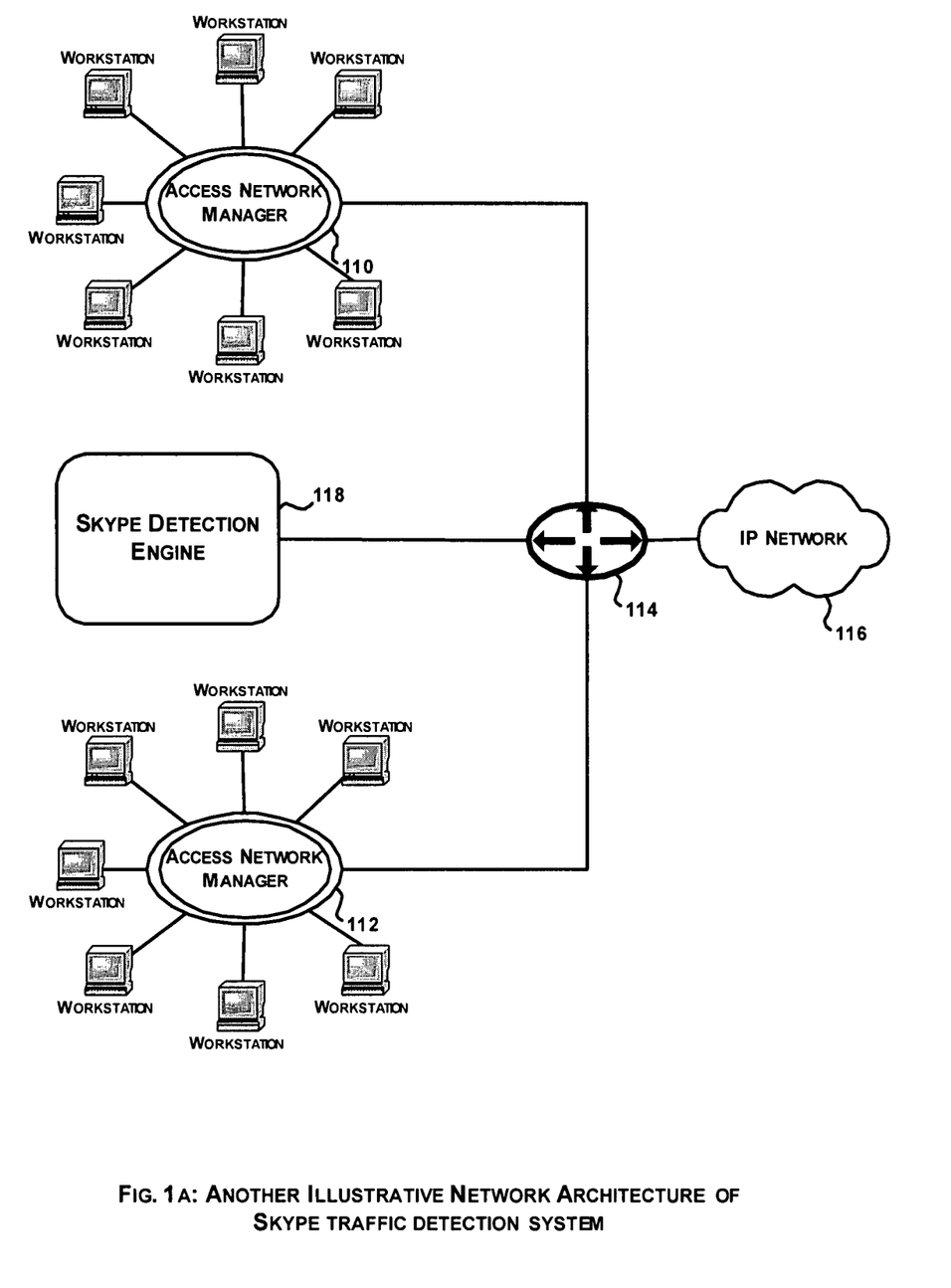
FIG. 1a depicts another illustrative network architecture of Skype traffic detection system.

FIG. 1a depicts an overview of another network architecture of SDE. In this scenario, the end user devices are connected directly to an access network manager (110 and 112), and these access network managers are connected to router (114) so as to establish connectivity to an external network (116). Observe that, even in this scenario, SDE (118) can operate in both passive and active modes.

Figure 2:
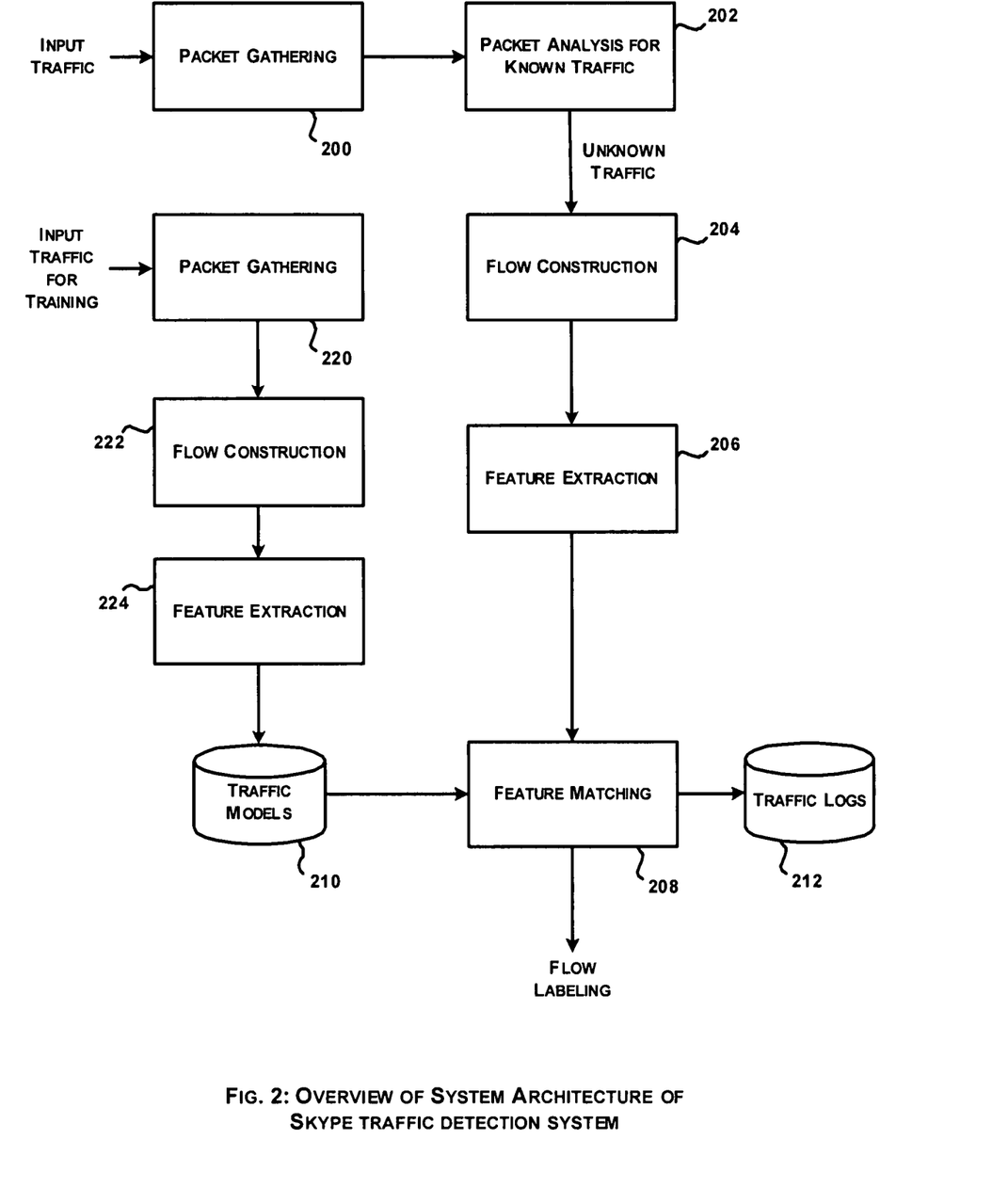
FIG. 2 depicts an overview of the system architecture of Skype traffic detection system.

FIG. 2 provides an overview of the system architecture of SDE. SDE operates input traffic gathered in terms of packets (200). Packet gathering can be in an offline mode wherein the gathered traffic is in a file to be processed by SDE; alternatively, SDE can obtain a copy of a packet as soon as it arrives at router (refer to FIGS. 1 and 1a). In 202, the packets are analyzed to determine if there are any known flows (such as HTTP, SMTP, FTP, and RTP) and the traffic related to these known flows are not considered for further analysis. For the remaining unknown traffic (204), the individual distinct flows are constructed from the input traffic and each flow is analyzed to extract flow-specific features (206). Finally, in 208, the flows are labeled based on the extent of match of the extracted flow-specific features with respect to the traffic models (210). The results for the flow-specific analysis are stored in a log file (212) for auditing and further use purposes. The traffic models are built during training phase in which pre-labeled traffic (both Skype and non-Skype) are input into the system. In order to generate models, packets are gathered (220), flows are constructed (222), and flow-specific features are extracted (224) to generate traffic models.

Figure 3:
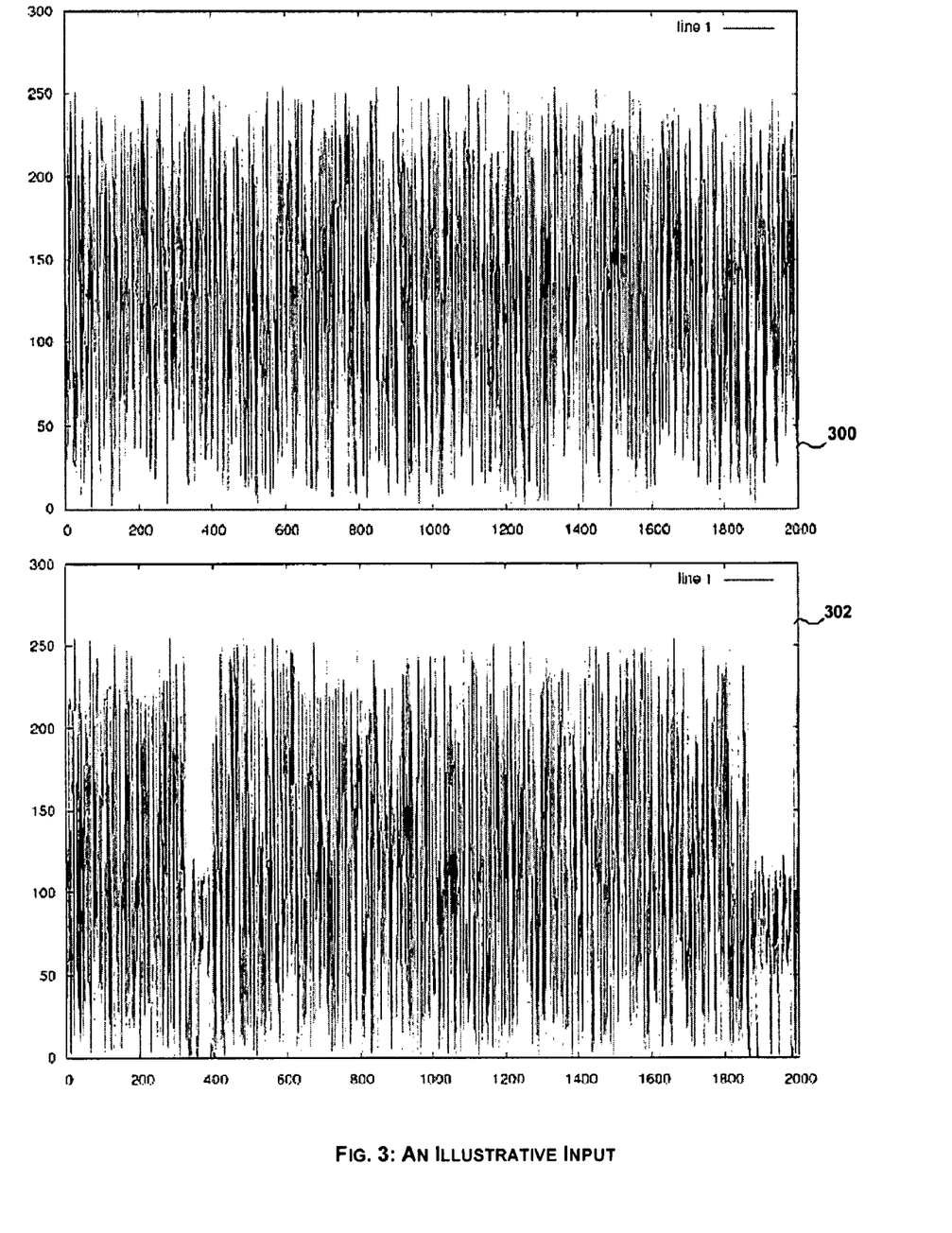
FIG. 3 depicts an illustrative input traffic.

FIG. 3 depicts an illustrative input for SDE. In 300, a sample Skype traffic is depicted while in 302, a sample GTalk traffic is depicted. The depicted traffic to some extent highlights the Skype traffic recognition complexity.

FIG. 4 provides an algorithm for traffic modeling. One of the most difficult tasks in Skype traffic detection is feature selection as Skype is a proprietary protocol and further, it uses a random port for communication. Most of the available signature based techniques are not useful for Skype traffic identification as payload is encrypted. It has been shown that the distributions of packet size and packet inter-arrival time are not of much use in Skype traffic identification. The present invention uses the encrypted payload to obtain the feature vector. Payload is obtained from a packet by removing the header part of the packet and the payload obtained from a sequence of packets is used to obtain the feature vector. A payload of predefined size (say, about 100,000 bytes) is analyzed with respect to the various bytes and a histogram of 256 possible byte values is generated. This histogram is used as a feature vector.

Vector quantization technique is used for classifying Skype and non-Skype traffic in Skype Detection Engine (SDE). SDE has two components: Training component and Detection component. During training, the Skype training data is used to obtain the code-book entries. Each code-book entry represents the cluster center of each voronoi region in vector space. Vector Quantization (VQ) is a very well known approximation technique, which is widely used in a variety of applications. This is one of the simple clustering technique that accelerates convergence. Given a set of k-dimensional vectors in the vector space Rk, VQ partitions them into finite sets of vectors based on the nearest neighbor criterion. Such sets are called as clusters and represents separate regions in the vector space.

During training, LBG based VQ (LBG VQ) is used to partition the vector space. In one of the experiments, a total number of 3200 vectors is used for obtaining 32 Skype code-book entries, and about 8000 vectors are used for obtaining 48 non-Skype code-book entries. Skype data contains both Skype UDP and Skype TCP traffic, and non-Skype data contains packets related to the various protocols such as HTTP, VOIP, SMTP, and P2P. A universal code-book is prepared by taking union of Skype and non-Skype code-book entries. Again, in one of the experiments, in the universal code-book, first 32 entries relate to Skype and the remaining 48 relate to non Skype. The algorithm used is as follows. The LBG VQ design algorithm is an iterative algorithm which alternatively solves two optimality criteria such as nearest neighbor condition and centroid condition. In this method, an initial code vector is set as the average of the entire training sequence. This code vector is then split into two. The iterative algorithm is run with these two vectors as the initial code-book. The obtained two code vectors are further split into four and the process is repeated until the desired number of code vectors is obtained.

Figure 5:
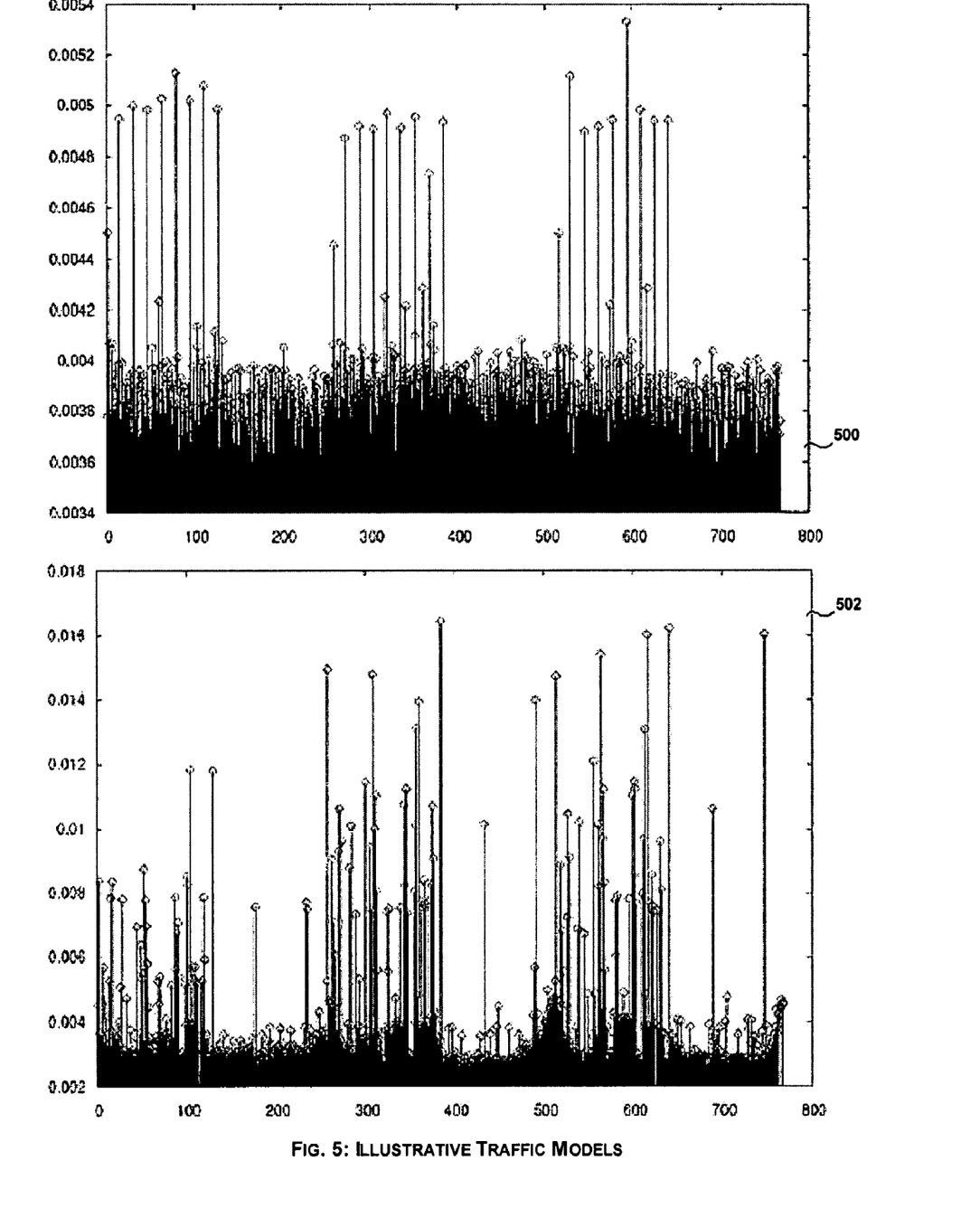
FIG. 5 depicts illustrative traffic models.

FIG. 5 depicts illustrative traffic models. 500 depicts a sequence of feature vectors related to Skype traffic while 502 depicts a sequence of feature vectors related to GTalk traffic. Observe the power of this feature vector in modeling Skype traffic as compared with modeling of non-Skype traffic such as GTalk.

Figure 6:
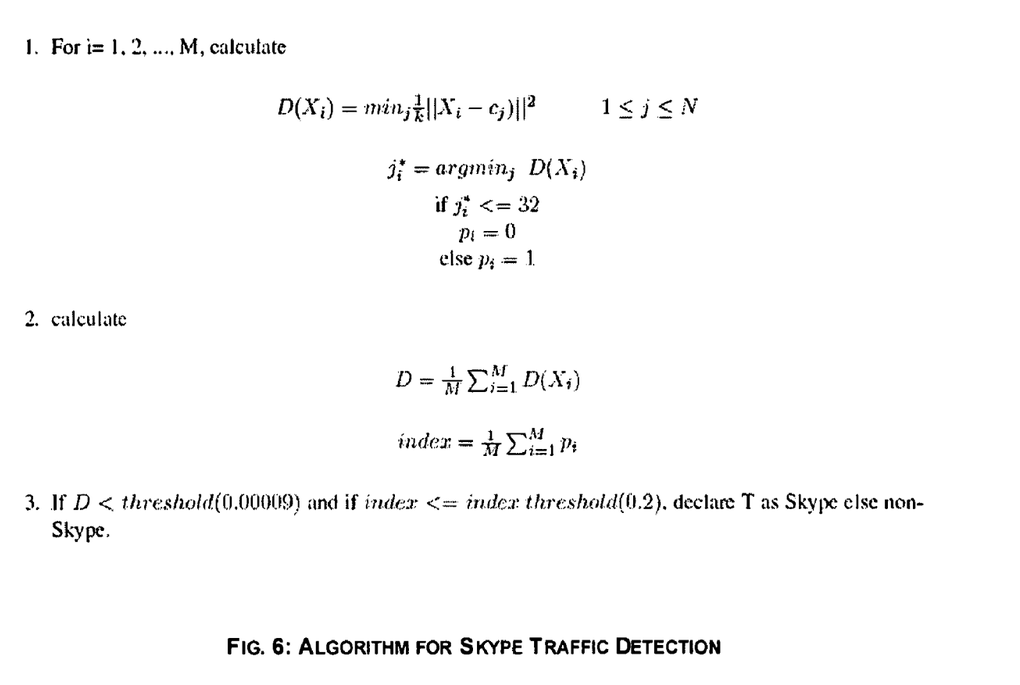
FIG. 6 provides an algorithm for Skype traffic detection.

FIG. 6 depicts an algorithm for Skype traffic detection. In the detection phase, the input traffic (in terms packets) needs to be categorized into Skype and non-Skype traffic. In order to find the traffic type that is nearest to the given data set, T. For this, the Euclidean distance between the ith vector, Xi, and the nearest cluster (best cluster) is computed:

$$D(Xi)=\min(j)(1/k)\|Xi-cj\|^2 \text{ with } 1<=j<=N \text{ and}$$

$$j(i)^*=\operatorname{argmin}(j)D(Xi) \text{ and if } j(i)^*<=32, \text{pi}=0 \text{ else pi}=1;$$

where N is the number of clusters, and k is the dimension of the vector Xi. It should be noted that, since the clusters depend on the traffic type, the mean vector, cj, for each cluster is also dependent on the traffic type. Now, the distortion of the data set, T, and it's label is given by $$D=(1/M)\operatorname{Sum}(i=1;i=M)D(Xi) \text{ and}$$

$$\text{index}=(1/M)\operatorname{Sum}(i=1;i=M)\text{pi};$$

where M is the number of vectors. The given traffic is classified as Skype if the distortion is below a preset threshold and index is below a preset index threshold else it is classified as non-Skype traffic.

Figure 7:
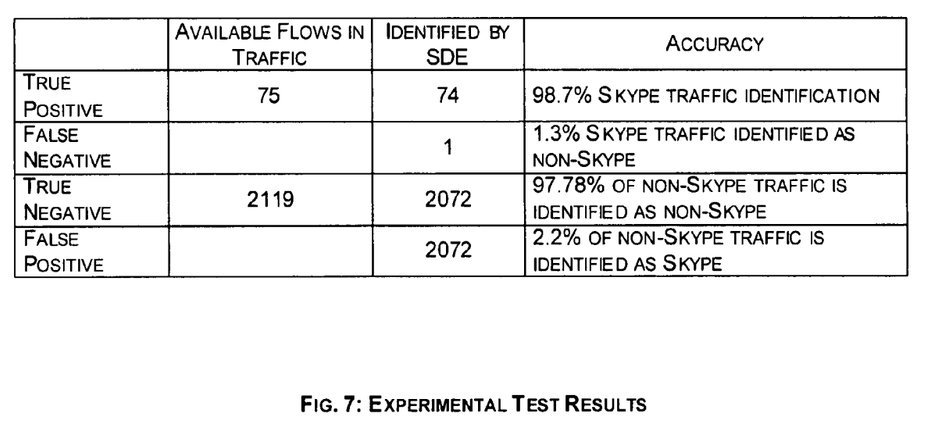
FIG. 7 depicts an illustrative test results.

FIG. 7 provides some experimental results. In order have a more practical scenario, about seventy systems are connected to an enterprise router that connects to the internet. The systems are used to generate various network traffic like Skype, http, https, P2P, VOIP (non-Skype), SMTP, FTP, and Streaming traffic. SDE could correctly identify about 98.7% of the Skype traffic and further, the system is able to correctly identify about 97.78% of the non-Skype traffic. These results indicate the robustness of the Skype detection system.

Thus, a system and method for Skype traffic detection is disclosed. Although the present invention has been described particularly with reference to the figures, it will be apparent to one of the ordinary skill in the art that the present invention may appear in any number of systems that perform encrypted traffic analysis. It is further contemplated that many changes and modifications may be made by one of ordinary skill in the art without departing from the spirit and scope of the present invention.

What is claimed is:

1. A Skype traffic detection system, SDE, for analyzing network traffic comprising a plurality of flows with each flow of said plurality of flows comprising a plurality of packets consisting of encrypted payload related to a proprietary peer to peer protocol, said system comprising:
   (a) Feature Extraction Element, for extracting a plurality of histogram based feature vectors, wherein a histogram based feature vector of said plurality of histogram based feature vectors is associated with a sequence of packets of the plurality of packets of a flow of said plurality of flows, said feature extraction element comprises a procedure to compute said histogram based feature vector from said sequence of packets, wherein said computing comprises: obtaining a payload from each of said sequence of packets, computing a frequency of occurrence of each byte pattern in said payload from each of said sequence of packets, and determining histogram of two hundred and fifty six byte values based on said frequency of occurrence of each byte pattern as said histogram based feature vector;
   (b) Training Element for generating a traffic model based on a plurality of training flows of said plurality of flows and a plurality of training feature vectors of said plurality of histogram based feature vectors, wherein each of said plurality of training feature vectors is associated with a sequence of packets of a plurality of packets of a training flow of said plurality of training flows; and
   (c) Detection Element for detecting Skype traffic in a flow of said plurality of flows based on said traffic model, wherein said Detection Element comprises a procedure to detect Skype traffic packets in said plurality of packets associated with said flow, said detecting comprises: grouping said plurality of packets into a plurality of packet sequences, determining the number of sequences in said plurality of packet sequences, determining a distortion of each of said plurality of packet sequences based on said traffic model, and determining traffic type of each of said plurality of packet sequences based on said distortion.

2. The system of claim 1, wherein said Training Element comprises a procedure to generate a Skype traffic model, wherein said generating comprises: obtaining a plurality of Skype traffic packets based on said plurality of training flows, grouping said plurality of Skype traffic packets into a plurality of packet sequences, determining a plurality of histogram based training feature vectors for said plurality of packet sequences of said plurality of skype traffic packets based on said plurality of training feature vectors, combining similar histogram based feature vectors of said plurality of histogram based training feature vectors to form a plurality of clusters, computing a plurality of cluster centroids, wherein each of said plurality of cluster centroids is associated with a cluster of said plurality of clusters, and forming said Skype traffic model based on said plurality of cluster centroids.

3. The system of claim 2, wherein said Training Element further comprises a procedure to generate a non-Skype traffic model, wherein said generating comprises: obtaining a plurality of non-Skype traffic packets based on said plurality of training flows, grouping said plurality of non-Skype traffic packets into a plurality of packet sequences, determining a plurality of histogram based training feature vectors for said plurality of packet sequences of said plurality of non-skype traffic packets based on said plurality of training feature vectors, combining similar histogram based feature vectors of said plurality of histogram based training feature vectors to form a plurality of clusters, computing a plurality of cluster centroids, wherein each of said plurality of cluster centroids is associated with a cluster of said plurality of clusters, and forming said non-Skype traffic model based on said plurality of cluster centroids.

4. The system of claim 3, wherein said Training Element further comprises a procedure to determine said traffic model based on said Skype traffic model and said non-Skype traffic model.

* * * * *